(12) United States Patent
Yee et al.

(10) Patent No.: US 11,981,480 B2
(45) Date of Patent: May 14, 2024

(54) SERVING DISH COVER

(71) Applicant: Dart Industries Inc., Orlando, FL (US)

(72) Inventors: Teo Sok Yee, Singapore (SG); Alec Vercruyssen, Aalst (BE); Arthur Lorré, Ghent (BE)

(73) Assignee: Dart Industries Inc., Orlando, FL (US)

( * ) Notice: Subject to any disclaimer, the term of this patent is extended or adjusted under 35 U.S.C. 154(b) by 125 days.

(21) Appl. No.: 17/961,503

(22) Filed: Oct. 6, 2022

(65) Prior Publication Data
US 2024/0116683 A1    Apr. 11, 2024

(51) Int. Cl.
  *B65D 51/24* (2006.01)
  *B65D 21/02* (2006.01)
  *B65D 25/28* (2006.01)

(52) U.S. Cl.
  CPC ....... *B65D 51/242* (2013.01); *B65D 21/0217* (2013.01); *B65D 25/2835* (2013.01); *B65D 2525/288* (2013.01)

(58) Field of Classification Search
  CPC .............. B65D 21/0217; B65D 51/242; B65D 2525/288; B65D 25/2835; B65D 25/28; B65D 25/2867; B65D 2525/286
  USPC ............. 220/212.5, 212, 318, 764, 762, 763
  See application file for complete search history.

(56) References Cited

U.S. PATENT DOCUMENTS

| 5,337,910 | A | * | 8/1994 | Picozza | ..................... | A23B 7/10 |
| | | | | | | 220/756 |
| 6,257,440 | B1 | * | 7/2001 | Perkins | .................. | A45C 13/26 |
| | | | | | | 220/760 |
| 11,155,382 | B1 | * | 10/2021 | Cai | ..................... | B65D 21/0223 |
| 2005/0006398 | A1 | * | 1/2005 | Manke | .................. | B65D 25/32 |
| | | | | | | 220/760 |

* cited by examiner

*Primary Examiner* — Robert J Hicks
*Assistant Examiner* — Sanjidul Islam
(74) *Attorney, Agent, or Firm* — Taylor J. Ross

(57) ABSTRACT

A cover for serving dish includes a main body with a handle depression. A handle is mounted within the depression for oscillation between a storage position and a operative position. A detent pin on the handle interacts with detent holes in the handle depression to hold the handle in the storage and operative positions against unintended movement.

3 Claims, 8 Drawing Sheets

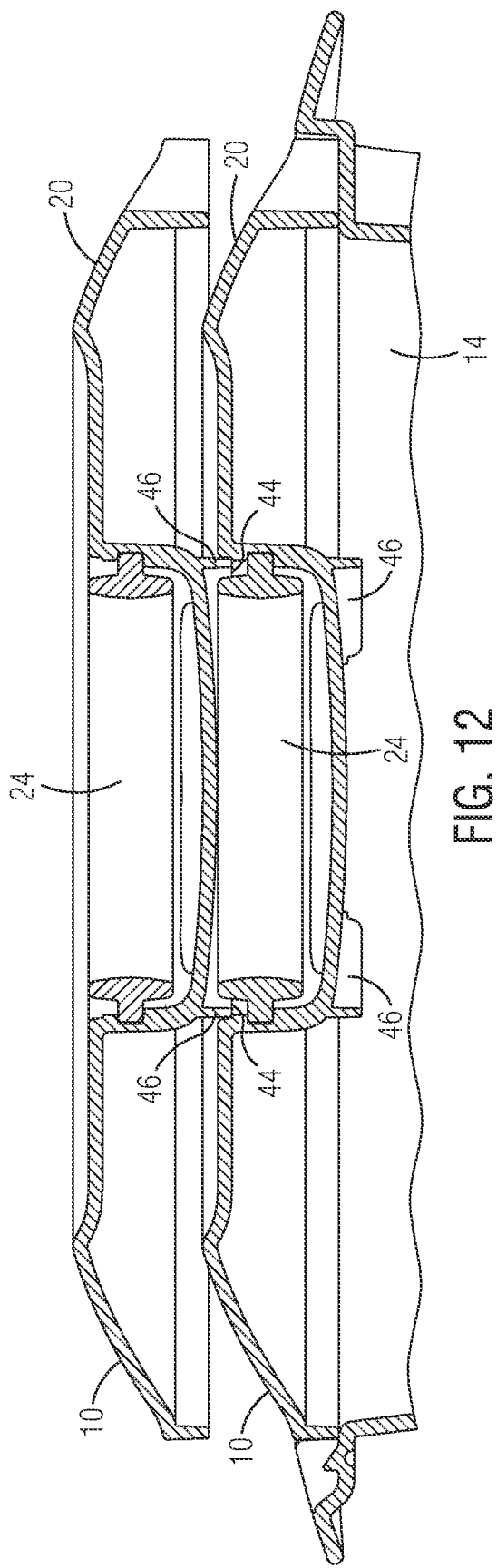
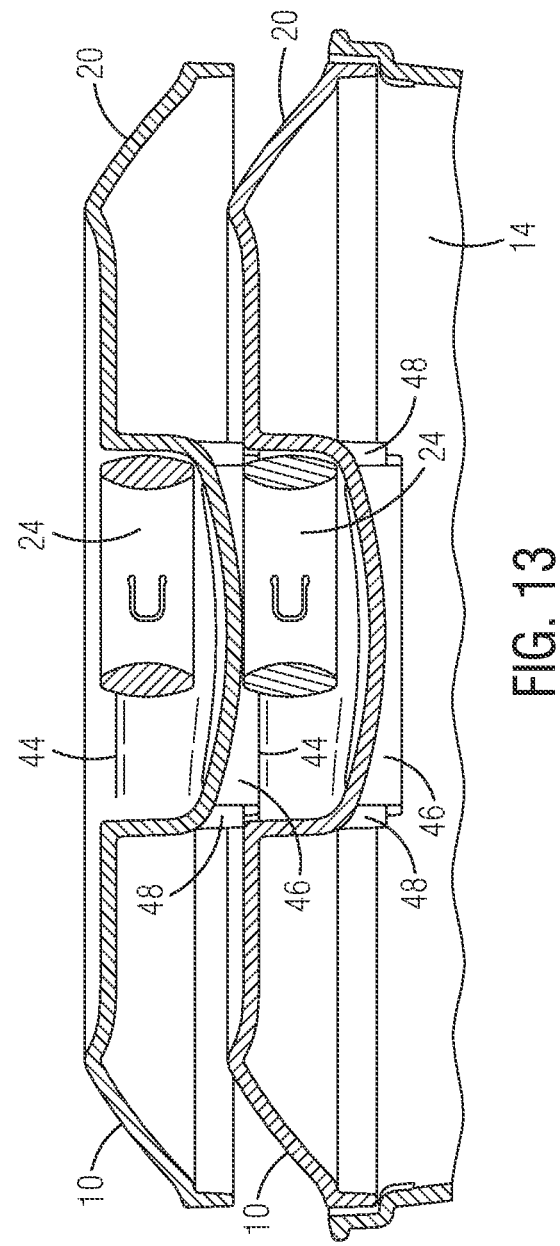
FIG. 12
FIG. 13

SERVING DISH COVER

CROSS REFERENCE TO RELATED APPLICATIONS

This application is related to co-pending of which are incorporated by reference herein.

STATEMENT REGARDING FEDERALLY SPONSORED RESEARCH

Not applicable.

BACKGROUND OF THE INVENTION

The present invention relates in general to food serving dishes, especially covered serving dishes.

It is common for food to be served in covered dishes. The base is a concave member which holds the food. The cover fits upon the base to close the concave base to help retain heat or cold, and to minimize contamination of the stored food. To aid in manually removing the cover, the covers typically include a handle.

SUMMARY OF THE INVENTION

An object of the present invention is to provide a food serving dish having a base and a cover with handle.

Another object of the present invention is to provide a cover with handle which is improved for storage.

A further object of the present invention is to provide a cover with a handle which is retractable to reduce storage height, and further the cover includes a foot which mates with a similar cover for stacking storage of covers.

These and other objects are achieved by a serving dish cover. The cover includes a main body with a handle depression. A handle is mounted within the depression for oscillation between a storage position and a operative position. A detent pin on the handle interacts with detent holes in the handle depression to hold the handle in the storage and operative positions against unintended movement.

BRIEF DESCRIPTION OF THE DRAWINGS

The objects and features of the invention noted above are explained in more detail with reference to the drawings, in which like reference numerals denote like elements, and in which:

FIG. 12 is a cross-sectional view along line 4-4 of FIG. 1 of stacked covers with handles in the storage position; and FIG. 13 is a cross-sectional view along line 2-2 of FIG. 1 of stacked covers with handles in the storage position.

DETAILED DESCRIPTION OF THE INVENTION

Figure 1:
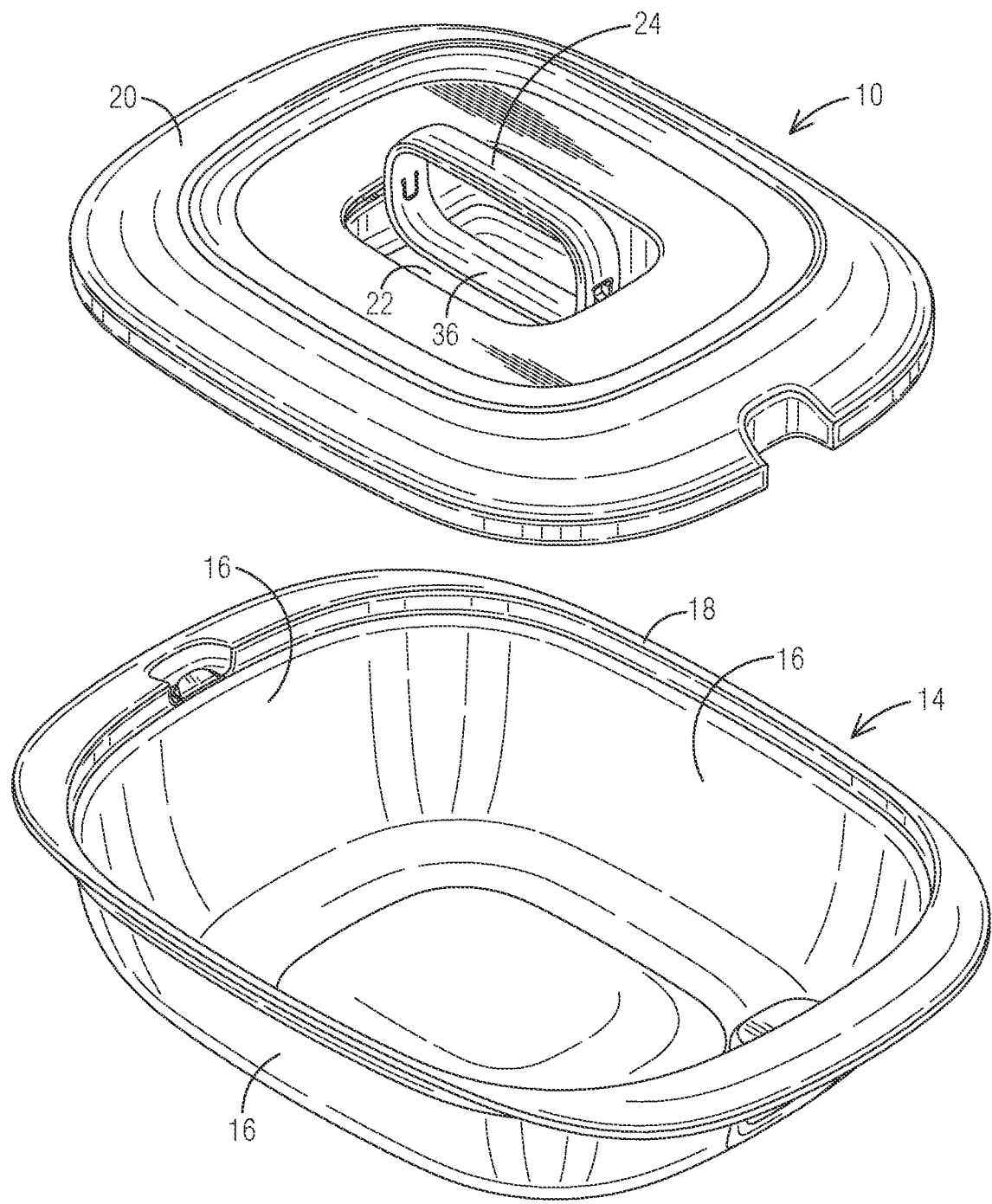
FIG. 1 is a top perspective exploded view of the serving dish cover according to the present invention in the operative configuration.

With reference to FIG. 1, a serving dish cover according to the present invention is generally designated by reference numeral 10. The cover 10 is intended for use with a serving dish 14. The dish 14 takes a generally concave form to create a central cavity for receiving food. The concave form is created by one or more sidewalls 16 which extend upward to a dish rim 18. The cover 10 includes a main body 20 sized and shaped to close the concavity in the dish 14 and including an outer periphery sized and shaped to rest upon the dish rim 18.

Figure 2:
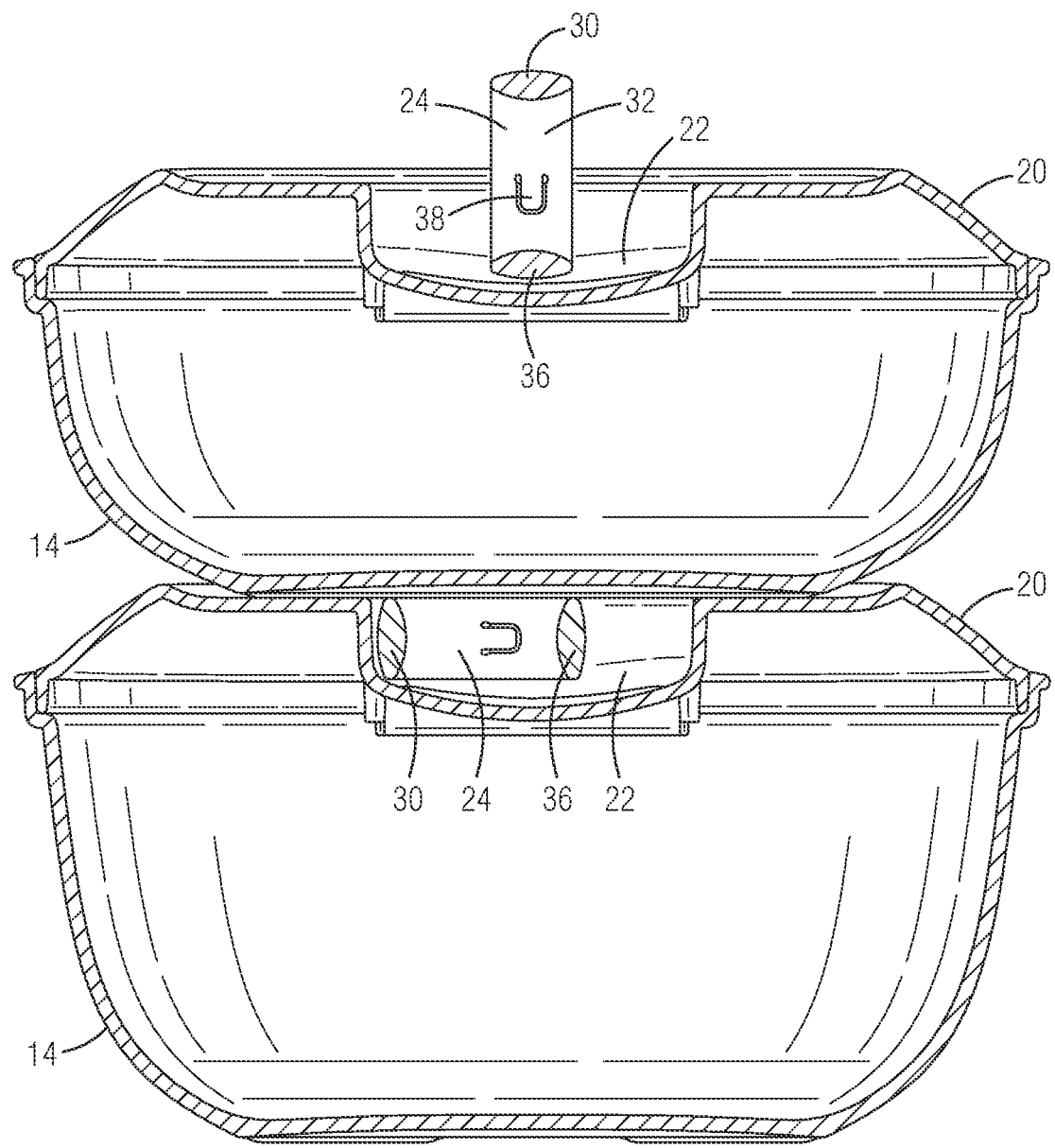
FIG. 2 is a side cross-sectional view along line 2-2 of FIG. 1, showing two serving dishes stacked.

In the embodiment shown, the dish 14 and cover 10 are generally oval when viewed form above. A variety of other shapes are possible as is known, including circular, rectangular, etc. Further, in the embodiment shown the outer periphery of cover 10 rests within the dish rim 18 (FIG. 2). Other configurations are possible, including the out periphery of cover 10 extending over and enclosing the base rim 18.

The main body 20 of cover 10 includes a handle depression 22, and also a handle 24. The handle 24 is formed as a separate piece which is secured to the main body 20. As is best illustrated in FIG. 2, the handle 24 is secured to the main body 20 in a manner which permits the handle to move from a storage position entirely within the handle depression 22 to an operative position extending vertically from the main body 20. As shown in FIG. 2, this arrangement of moving the handle 24 from a storage position to an operative position allows secure stacking of multiple copies of the combined dish 14 and cover 10. As shown here, the lower set of dish 14 and cover 10 has the handle 24 in the storage position. This allows the upper set of dish 14 and cover 10 to rest securely upon the main body 20 of the lower cover 10. The handle 24 of the upper set is shown in the operative position, ready to be grasped by a user to manually remove the upper cover 10.

Figure 3:
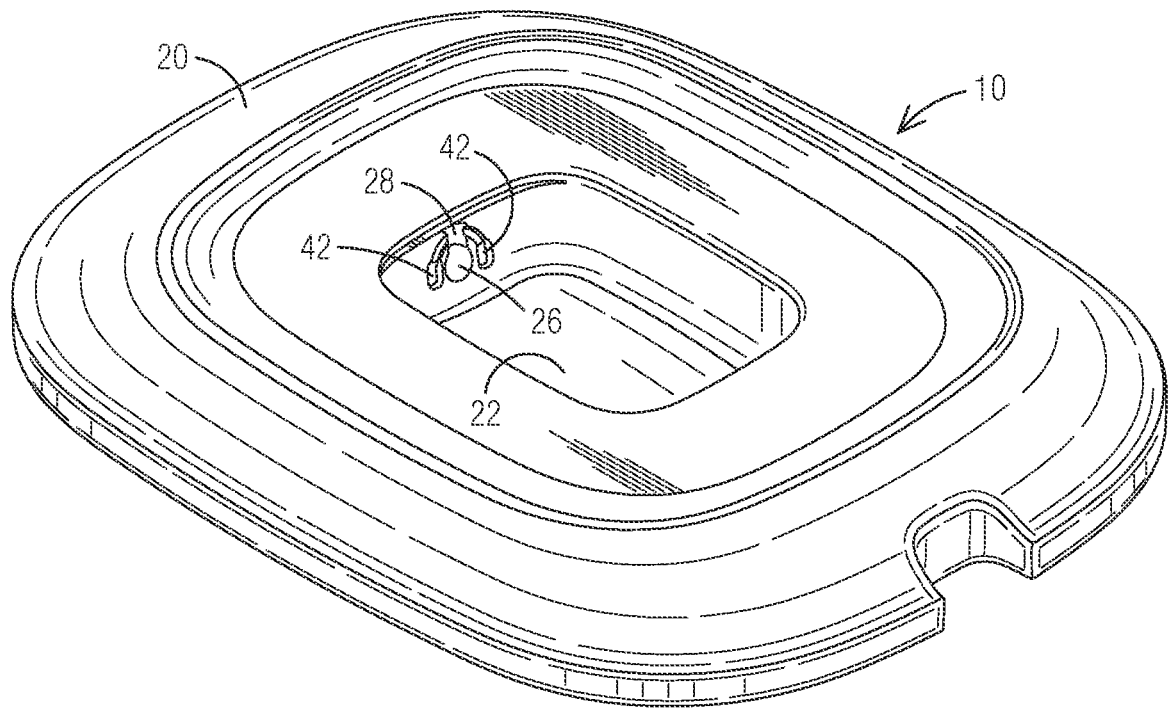
FIG. 3 is top perspective view of a cover main body without handle.
Figure 4:
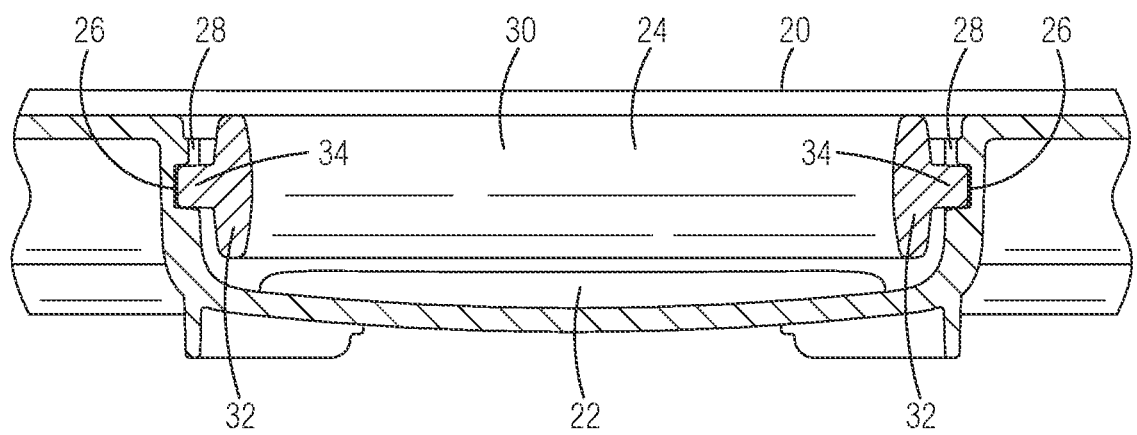
FIG. 4 is a detail cross-sectional view along line 4-4 of FIG. 1.
Figure 5:
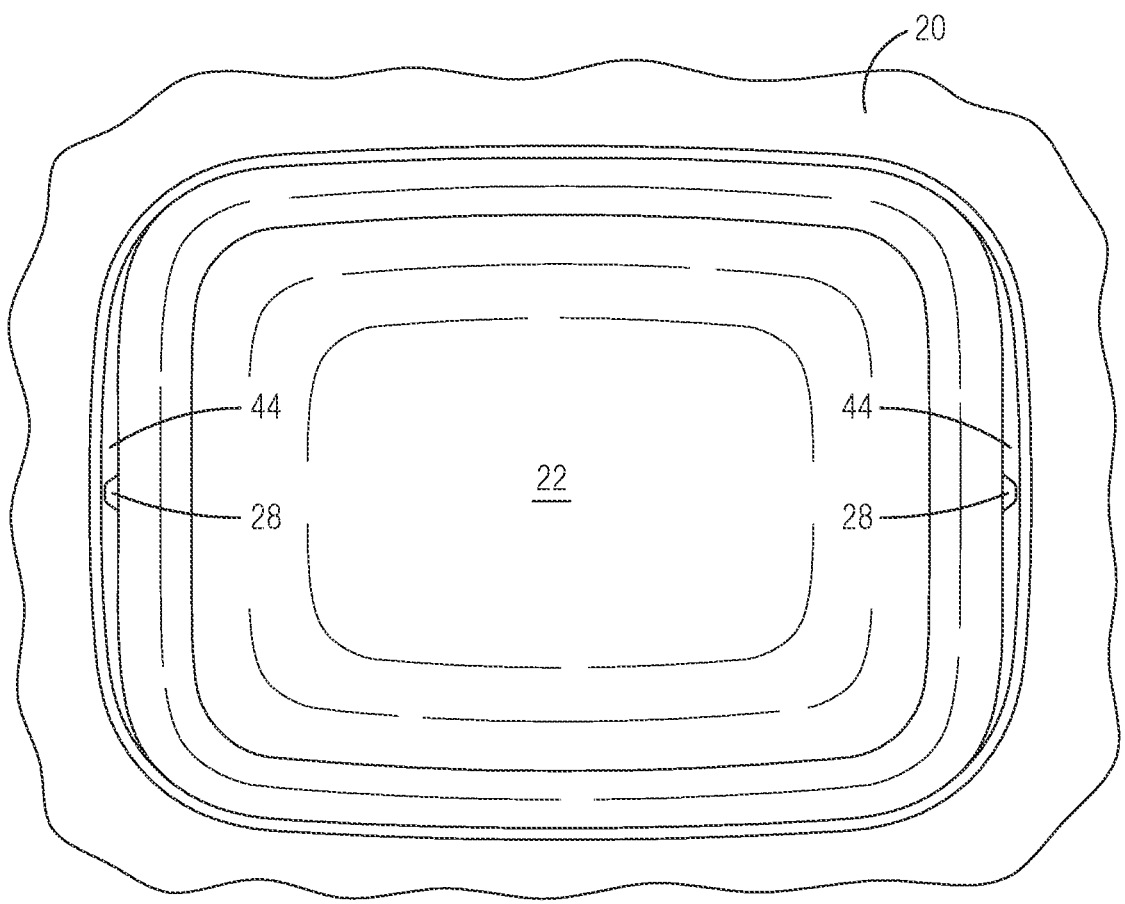
FIG. 5 is a detailed top view of the handle depression with handle removed.

As shown in FIGS. 3 and 4, the handle depression 22 includes a pair of opposed and aligned axle holes 26 spaced from the outer face of the main body 20 to be formed within the handle depression 22. While not required, it is preferred that the handle depression 22 also include a pair of axle slots 28 in the form of shallow grooves leading from the outer face of main body 20 into the handle depression 22 and each one ending at the associated axle hole 26. While not required, it is preferred that the axle holes 26 have closed ends, and do not extend fully through the main body 20.

The handle 24 includes a main portion 30 which extends across the handle depression 22 and at each end of the main portion a side portion 32. In the embodiment shown, the main and side portions 30 and 32 are relatively thin and thus define a U-shape. Other arrangements are possible, such as handle 24 being formed as a card or flat panel which is manually pinched rather than gripped. Each of the side portions 32 includes an axle pin 34 which together are opposed and aligned. The size and shape of handle 24 is such that each axle pin 34 will be closely received within an associated axle hole 26.

The axle pins 34 are spaced from the main portion 30 such that oscillation of the handle 24 about the axle pins 34 will cause the main portion 30 to rise from the main body 20 when handle 24 is in the operative position as shown in FIG. 1. The handle depression 22 is sized and shaped to receive a significant portion, if not all, of the handle 24 when rotated downward toward the storage position shown in FIG. 4. While not required, in the preferred embodiment shown, the handle depression 22 is sized to substantially, if not fully, receive the handle 24 if rotated in either direction toward the storage position. In this regard, it would be said that the storage position could be in either of two configurations: right or left depending upon the direction of oscillation.

While not required, in the preferred embodiment the handle 24 further includes a base portion 36 extending between the side portions, such that the handle 24 takes the form of a closed polygon. In the embodiment shown, this polygon shape is a rectangle with curved corners. This increases the strength of the handle, especially in the area adjacent the axle pins 34 to help ensure they do not become accidentally dislodged. Additionally, when the handle 24 is in the storage position, the user may press upon the base portion 36 to start oscillation of the handle 24 toward the operative position, and thus make it easier to grasp the main portion 30 for completing the oscillation. Further, it is also preferred that the handle depression 22 have a depth (and the axle pins 34 be so positioned) that the base portion 36 may be fully received within the handle depression, but that the handle depression 22 is too shallow for fully receiving the main portion 30. In other words, it is preferred that the handle depression 22 be formed so as to prevent the inversion of the handle 24 to a position opposite of the operative position.

While not required, it is preferred that the cover 10 include means to hold the handle 24 in the storage and operative positions against inadvertent movement. To effect this, at least one (and preferably both) of the side portions 32 include a U-shaped slot which thereby forms a detent tongue 38. Each detent tongue includes an outward facing detent pin 40 adjacent its free end. It is also preferred that each detent tongue 38 have a reduced thickness to permit easier flexing of the detent tongue.

Figure 6:
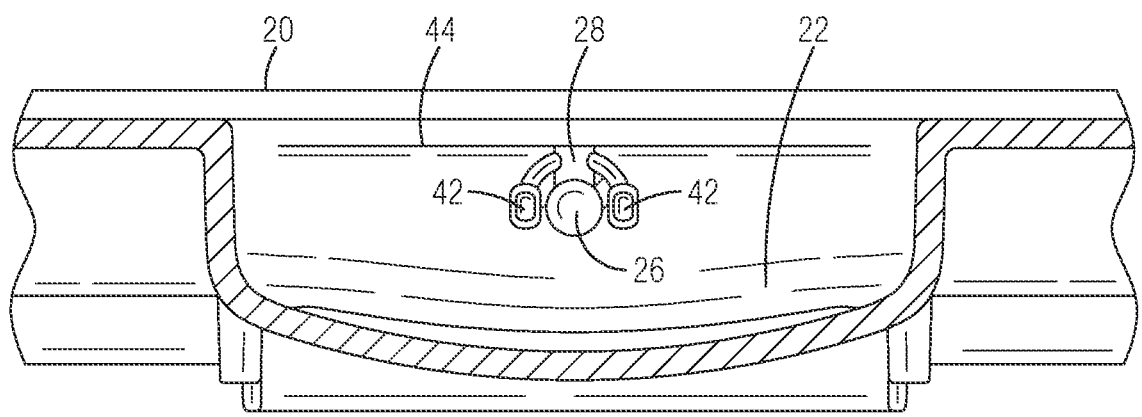
FIG. 6 is a detailed cross-sectional view along line 6-6 of FIG. 3.
Figure 7:
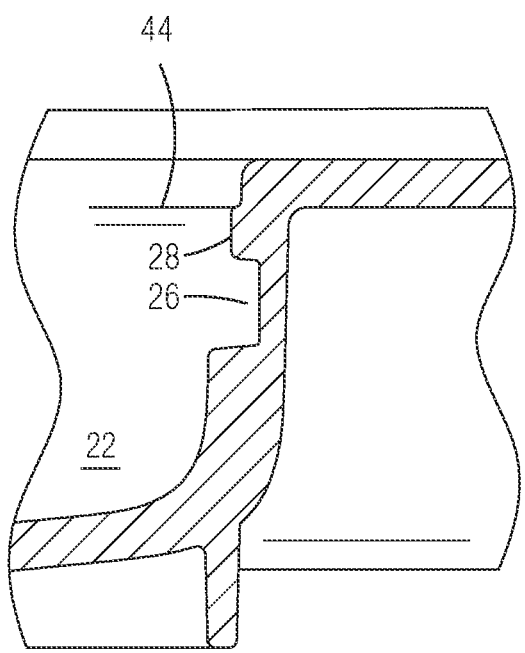
FIG. 7 is a detailed cross-sectional view along line 7-7 of FIG. 3.
Figure 8:
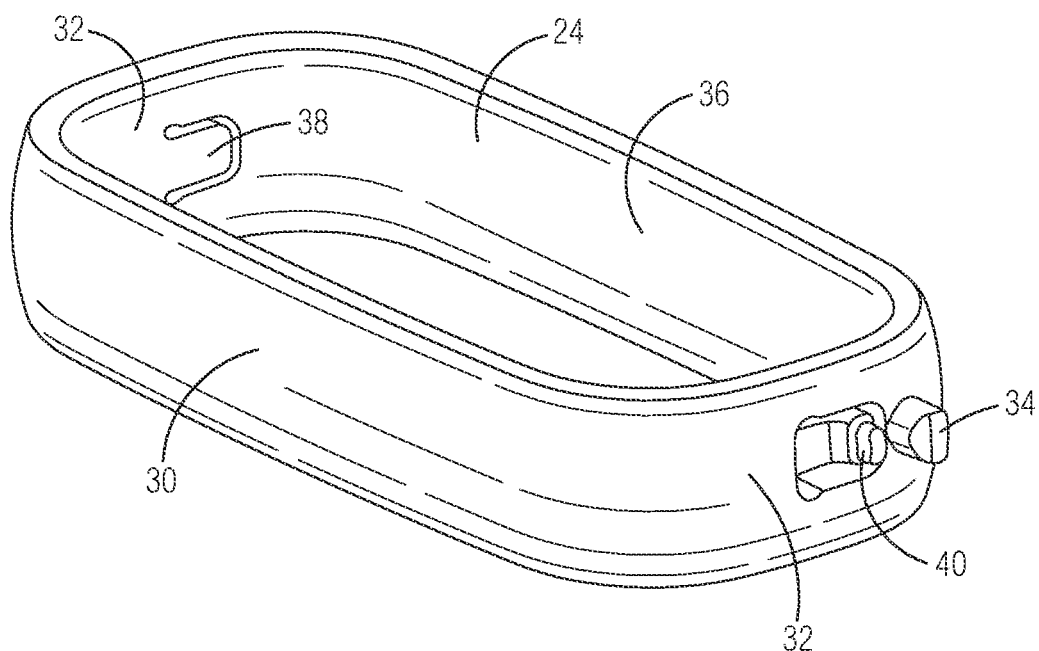
FIG. 8 is perspective view of a handle.
Figure 9:
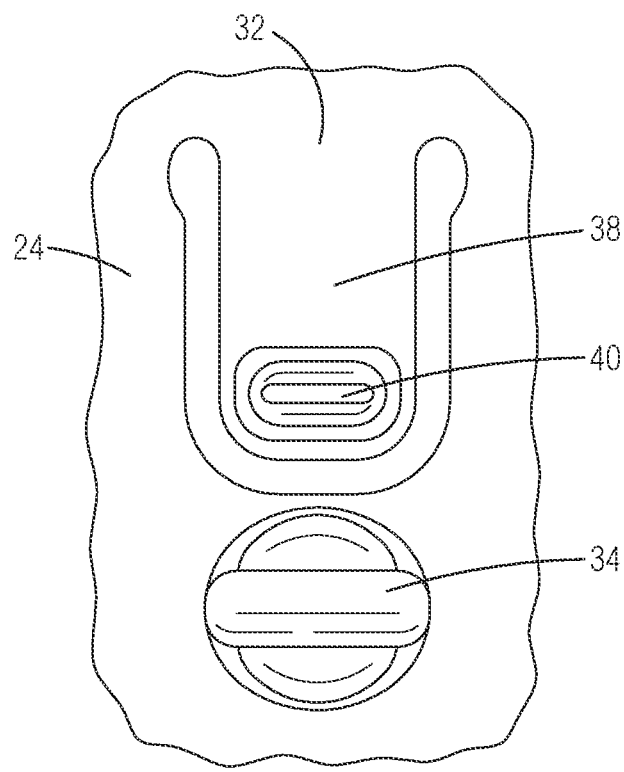
FIG. 9 is a detailed side view a handle of FIG. 8.
Figure 10:
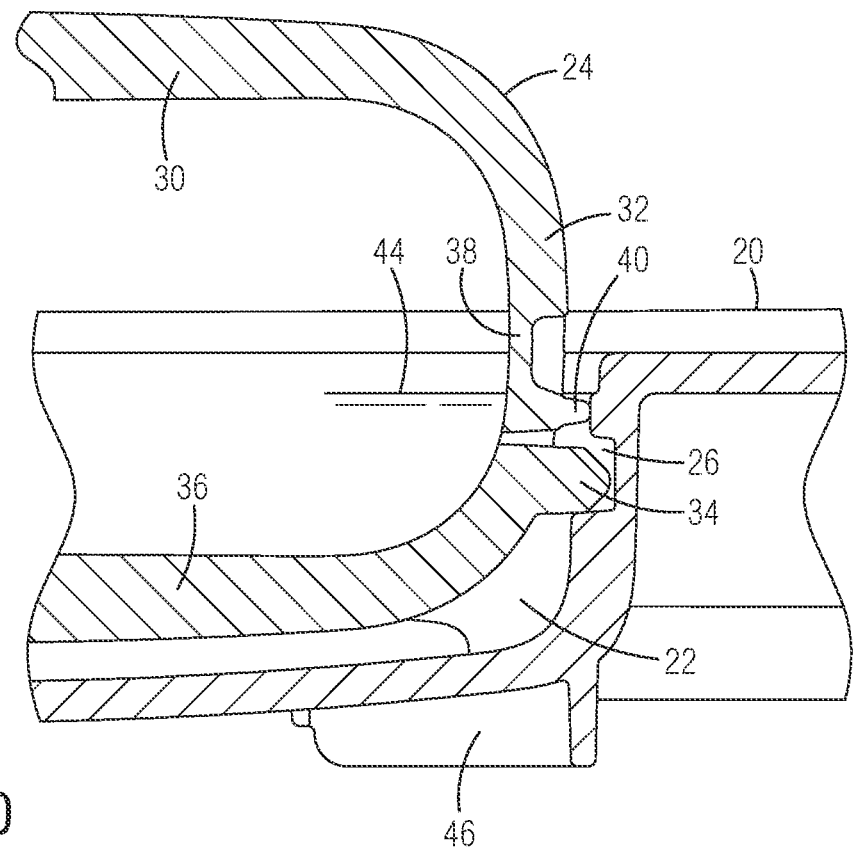
FIG. 10 is a detailed cross-sectional view a long line 10-10 of FIG. 2.
Figure 11:
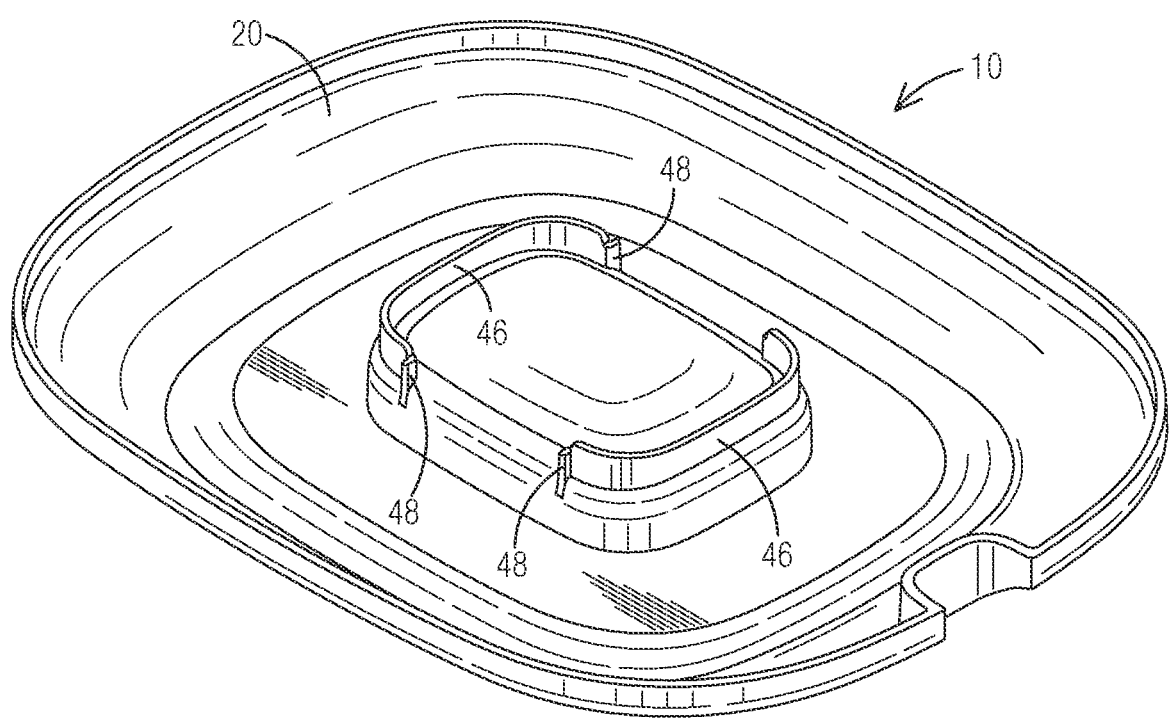
FIG. 11 is a bottom perspective view of a cover.

As best shown in FIGS. 3 and 6, the handle depression 22 may further include at least one detent hole 42 adjacent the axle hole 26 at a position to receive the detent pin 40 therein. To allow handle 24 to be mounted in either position, it is preferred that two detent tongues 38 be provided, one at each end, and that two detent holes 42 are provided, one adjacent each axle hole 26. As may be envisioned, when the handle 24 is oscillated downward to the storage position, the detent pin 40 will enter the detent hole 42 and thus serve to hold the handle 24 in the storage position against inadvertent oscillation. Manually oscillating the handle 24 toward the operative position will cause the detent tongue 38 to flex and allow detent pin 40 to exit the detent hole during the oscillation. As illustrated in FIG. 10, once the handle 24 has been rotated to the operative position, the detent pin 40 may will overlie the axle slot 28 and the detent tongue will flex outward to insert the detent pin 40 into the axle slot 28. As such, the handle 24 will then be held in the operative position against inadvertent oscillation until next manually moved. While not required, it is preferred that each axle hole 26 have two of the detent holes 42, one on each side for each of the two storage positions (right and left).

While the above elements may be formed of various materials, it is preferred that each of the main body 20 and handle 24 be a monolithic member formed of injection-molded plastic.

In a further aspect of the inventive cover 10, it is preferred that the upper edge of the handle depression include one or more support ledges 44. In the embodiment shown, a pair of support ledges 44 are shown, one above each of the axle holes 26. Further, the underside of the main body 20, and in particular the underside of the handle depression 22, includes one or more support feet 46 sized and shaped to mate with and rest upon the support ledges 44. As may be seen, this arrangement allows for a cover 10 to be stored upon another of the covers 10 in a stacking relationship as shown in FIGS. 12 and 13. With the support feet 46 of an upper cover 10 received partially with the handle depression 22 of a lower cover 10, this will resist lateral movement of the upper cover 10 and provide stability.

Stability may be further improved by providing each of the support feet 46 with a support flange 48 extending radially outward and having a depth such that in the stacked position shown in FIGS. 12 and 13, the support flange 48 rests upon the upper face of the main body 20 of the lower cover 10. This will allow the support ledges 44 to be made thinner and less aesthetically obtrusive while providing good vertical load bearing for stacking multiple covers 10

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A serving dish cover, comprising:
  a main body, including a handle depression, and within said handle depression including a pair of opposed and aligned axle holes, and a pair of axle slots, each said axle slot extending from a top face of said main body into said handle depression and terminating at an associated one of said axle holes, said main body further including within said handle depression at least one detent hole associated with each said axle hole; and
  a handle mounted to said main body for oscillation between a storage position and an operative position, said handle including a main portion and a pair of spaced side portions, at least one said side portion including a detent tongue having a detent pin adjacent a free end of said detent tongue, and wherein said detent pin and said detent hole are positioned such that said detent pin is received within said detent hole when said handle is in said storage position, and said detent pin is received within said axle slot when said handle is in said operative position, said handle being formed as a monolithic unit.

2. A serving dish cover as in claim 1, wherein said handle is plastic, and further includes a base portion extending between said side portions and spaced from said main portion.

3. A serving dish cover as in claim 1, wherein said handle is fully received within said handle depression when in said storage position.

* * * * *